US010452710B2

(12) United States Patent
    Agrawal

(10) Patent No.: US 10,452,710 B2
(45) Date of Patent: Oct. 22, 2019

(54) SELECTING CONTENT ITEMS BASED ON RECEIVED TERM USING TOPIC MODEL

(71) Applicant: Microsoft Technology Licensing, LLC, Redmond, WA (US)

(72) Inventor: Varun Agrawal, Atlanta, GA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1057 days.

(21) Appl. No.: 14/870,245

(22) Filed: Sep. 30, 2015

(65) Prior Publication Data

US 2017/0091322 A1    Mar. 30, 2017

(51) Int. Cl.
*G06F 16/00* (2019.01)
*G06F 16/68* (2019.01)
*G06F 16/638* (2019.01)
*G06F 16/33* (2019.01)
*G06F 16/9535* (2019.01)
*G06F 16/9032* (2019.01)
*G06F 16/683* (2019.01)

(52) U.S. Cl.
CPC .......... *G06F 16/68* (2019.01); *G06F 16/3338* (2019.01); *G06F 16/3346* (2019.01); *G06F 16/638* (2019.01); *G06F 16/685* (2019.01); *G06F 16/90324* (2019.01); *G06F 16/9535* (2019.01)

(58) Field of Classification Search
None
See application file for complete search history.

(56) References Cited

U.S. PATENT DOCUMENTS

| | | | |
|---|---|---|---|
| 7,919,706 B2 | 4/2011 | Tsui et al. | |
| 8,271,112 B2 | 9/2012 | Fujihara et al. | |
| 8,443,290 B2 | 5/2013 | Bill | |
| 8,644,971 B2 | 2/2014 | Weinstein | |
| 2008/0147215 A1* | 6/2008 | Kim | G06F 17/30746 700/94 |
| 2010/0131569 A1* | 5/2010 | Jamison | G06F 17/3071 707/803 |
| 2013/0311487 A1 | 11/2013 | Moore et al. | |
| 2014/0079297 A1 | 3/2014 | Tadayon et al. | |
| 2014/0164454 A1 | 6/2014 | Zhirkov et al. | |

(Continued)

OTHER PUBLICATIONS

Dang, et al., "Machine Learning Approaches for Mood Classification of Songs toward Music Search Engine", In Proceedings of International Conference on Knowledge and Systems Engineering, Oct. 13, 2009, pp. 144-149.

(Continued)

*Primary Examiner* — Son T Hoang

(57) ABSTRACT

Lyrics associated with songs are processed to generate a probabilistic topic model that includes probabilities for terms of the lyrics with respect to one or more predetermined topics. At a later time, a user may desire to hear songs that are associated with a particular term, and may submit the term using a user interface. When the term is received, the probabilities of the probabilistic model are used to identify a topic of the predetermined topics that is most likely associated with the received term. The probabilistic model is used to identify songs that are associated with the identified topic, and some or all of the identified songs are presented as being related to the received term in the user interface.

20 Claims, 6 Drawing Sheets

(56) References Cited

U.S. PATENT DOCUMENTS

2014/0280207 A1* 9/2014 Renders .............. G06F 17/3053
 707/748
2015/0052115 A1 2/2015 Sharifi

OTHER PUBLICATIONS

Meyers, Owen Craigie, "A Mood-Based Music Classification and Exploration System", In Master's Thesis, Jun. 2007, pp. 1-93.
Laurier, et al., "Indexing Music by Mood: Design and Integration of an Automatic Content-Based Annotator", In Journal of Multimedia Tools and Applications, vol. 48, Issue 1, May 2010, pp. 1-5.
Choi, et al., "Topic Modeling Users' Interpretations of Songs to Inform Subject Access in Music Digital Libraries", In Proceedings of the 15th ACM/IEEE-CS Joint Conference on Digital Libraries, Jun. 21, 2015, pp. 183-186.
Shen, et al., "Modeling Concept Dynamics for Large Scale Music search", In Proceedings of the 35th international ACM SIGIR conference on Research and development in information retrieval, Aug. 12, 2012, pp. 455-464.
Buccoli, et al., "A Music Search Engine Based on Semantic Text-Based Query", In Proceedings of IEEE 15th International Workshop on Multimedia Signal Processing, Sep. 30, 2013, pp. 254-259.
Bertin-Mahieux, et al., "Autotagger: A model for Predicting Social Tags from Acoustic Features on Large Music Databases", In Journal of New Music Research, vol. 37, Issue 2, Jun. 2008, pp. 1-25.
Blei, David M., "Probabilistic Topic Models", In Magazine of Communications of the ACM, vol. 55, Issue 4, Apr. 2012, pp. 77-84.
Blei, et al., "Latent Dirichlet Allocation", In Journal of Machine Learning Research, vol. 3, Jan. 3, 2003, pp. 993-1022.
Cunningham, et al., "Organizing Digital Music for Use: An Examination of Personal Music Collections", In Proceedings of 5th International Conference on Music Information Retrieval, Oct. 10, 2004, 8 pages.
Hoffman, et al., "Stochastic Variational Inference", In Journal of Machine Learning Research, vol. 14, May 2013. pp. 1303-1347.
Knees, et al., "A Music Search Engine Built upon Audio-based and Web-based Similarity Measures", In Proceedings of the 30th annual international ACM SIGIR conference on Research and development in information retrieval, Jul. 23, 2007, pp. 447-454.
Laurier, et al., "Multimodal Music Mood Classification using audio and Lyric", In Proceedings of the 7th International Conference on Machine Learning and Applications, Dec. 11, 2008, pp. 1-6.
Logan, et al., "Semantic Analysis of Song Lyrics", In Proceedings of IEEE International Conference on Multimedia and Expo, vol. 2, Jun. 30, 2004, pp. 827-830.
Mandel, et al., "Multiple-Instance Learning for Music Information Retrieval", In Proceedings of 9th International Conference on Music Information Retrieval, Sep. 14, 2008, pp. 577-582.
Porteous, et al., "Fast Collapsed Gibbs Sampling for Latent Dirichlet Allocation", In Proceedings of 14th ACM SIGKDD International Conference on Knowledge Discovery and Data Mining, Aug. 24, 2008, pp. 569-577.
Steyvers, et al., "Probabilistic Topic Models", In Journal Handbook of Latent Semantic Analysis, vol. 427, Issue 7, Retrieved on: Jul. 7, 2015, 15 pages.
Tang, et al., "Understanding the Limiting Factors of Topic Modeling via Posterior Contraction Analysis", In Proceedings of the 31st International Conference on Machine Learning, vol. 32, Jun. 21, 2014, 9 pages.
Turnbull, et al., "Semantic Annotation and Retrieval of Music and Sound Effects", In IEEE Transactions on Audio, Speech, and Language Processing, vol. 16, Issue 2, Feb. 2008, pp. 467-476.
Turnbull, et al., "Modeling Music and Words Using a Multiclass Naive Bayes Approach", In Proceedings of the 7th International Conference on Music Information Retrieval, Oct. 8, 2006, 6 pages.
Yang, et al., "Improving Musical Concept Detection by Ordinal Regression and Context Fusion", In Proceedings of 10th International Society for Music Information Retrieval Conference, Oct. 26, 2009.
"International Search Report and Written Opinion Issued in PCT Application No. PCT/US2016/053217", dated Nov. 29, 2016, 11 Pages.
"Second Written Opinion Issued in PCT Application No. PCT/US2016/053217", dated Aug. 17, 2017, 7 Pages.
"International Preliminary Report on Patentability Issued in PCT Application No. PCT/US2016/053217", dated Dec. 14, 2017, 8 Pages.

* cited by examiner

SELECTING CONTENT ITEMS BASED ON RECEIVED TERM USING TOPIC MODEL

BACKGROUND

With the explosive growth of music data enabled by online distribution and sharing, finding relevant ways to organize and index music is useful for everyday users and for search engines and music providers. Music listeners often wish for a smart playlist generator based on their moods, feelings, or concepts expressed in the songs. Similarly, many users of search engines and smart personal assistants often query for music based on certain concepts or aspects. For example, a user planning for long automobile trip may want to retrieve songs that have embedded the concepts of travel, roads, and cars. Another user may want music related to rain to listen to on a rainy day.

Previous approaches to match songs and concepts, or other content items, have focused on a signal processing approach where acoustic properties of songs are analyzed and compared, or a metadata-based approach where metadata and annotations, such as genre, associated with the songs are analyzed and compared. However, these approaches are computationally expensive and do not accurately correlate songs with particular concepts or moods.

SUMMARY

Lyrics associated with songs are processed to generate a probabilistic topic model that includes probabilities for terms of the lyrics with respect to one or more predetermined topics. At a later time, a user may desire to hear songs that are associated with a particular term, and may submit the term using a user interface. When the term is received, the probabilities of the probabilistic model are used to identify a topic of the predetermined topics that is most likely associated with the received term. The probabilistic model is then used to identify songs that are associated with the identified topic, and some or all of the identified songs are presented as being related to the received term in the user interface.

In an implementation, a system includes at least one computing device and a recommendation engine. The recommendation engine is adapted to, for each song of a plurality of songs, determine a plurality of terms associated with the song, and determine a plurality of topics. The recommendation is further adapted to, for each term of the plurality of terms associated with each song, determine a probability for the term with respect to each of the topics of the plurality of topics. The recommendation engine is further adapted to, for each song of the plurality of songs, determine a probability for the song with respect to each of the topics of the plurality of topics. The recommendation engine is further adapted to receive a term of the plurality of terms associated with each song, based on the determined probabilities for the received term with respect to each of the topics of the plurality of topics, select a topic of the plurality of topics, based on the selected topic and the determined probabilities for each song with respect to the selected topic, select one or more songs of the plurality of songs, and provide the selected one or more songs in response to the received term.

In an implementation, a topic model is received by a computing device. A term of a plurality of terms is received by the computing device. Based on the received term and the topic model, a topic of the plurality of topics that is associated with the received term is determined by the computing device. Based on the determined topic and the topic model, one or more songs that are associated with the determined topic are selected from a plurality of songs by the computing device. Indicators of the selected one or more songs are provided by the computing device.

In an implementation, a plurality of content items is received by a computing device. For each content item, a plurality of terms associated with the content item is determined by the computing device. A plurality of topics is determined by the computing device. For each term of the plurality of terms associated with each content item, a probability for the term with respect to each of the topics of the plurality of topics is determined by the computing device. For each content item of the plurality of content items, a probability for the content item with respect to each of the topics of the plurality of topics is determined by the computing device. A term of the plurality of terms associated with each of the plurality of content items is received by the computing device. Based on the determined probabilities for the received term with respect to each of the topics of the plurality of topics, a topic of the plurality of topics is selected by the computing device. Based on the selected topic and the determined probabilities for each content item with respect to the selected topic, one or more content items are selected by the computing device. The selected one or more content items are provided in response to the received term by the computing device.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there is shown in the drawings example constructions of the embodiments; however, the embodiments are not limited to the specific methods and instrumentalities disclosed. In the drawings.

DETAILED DESCRIPTION

Figure 1:
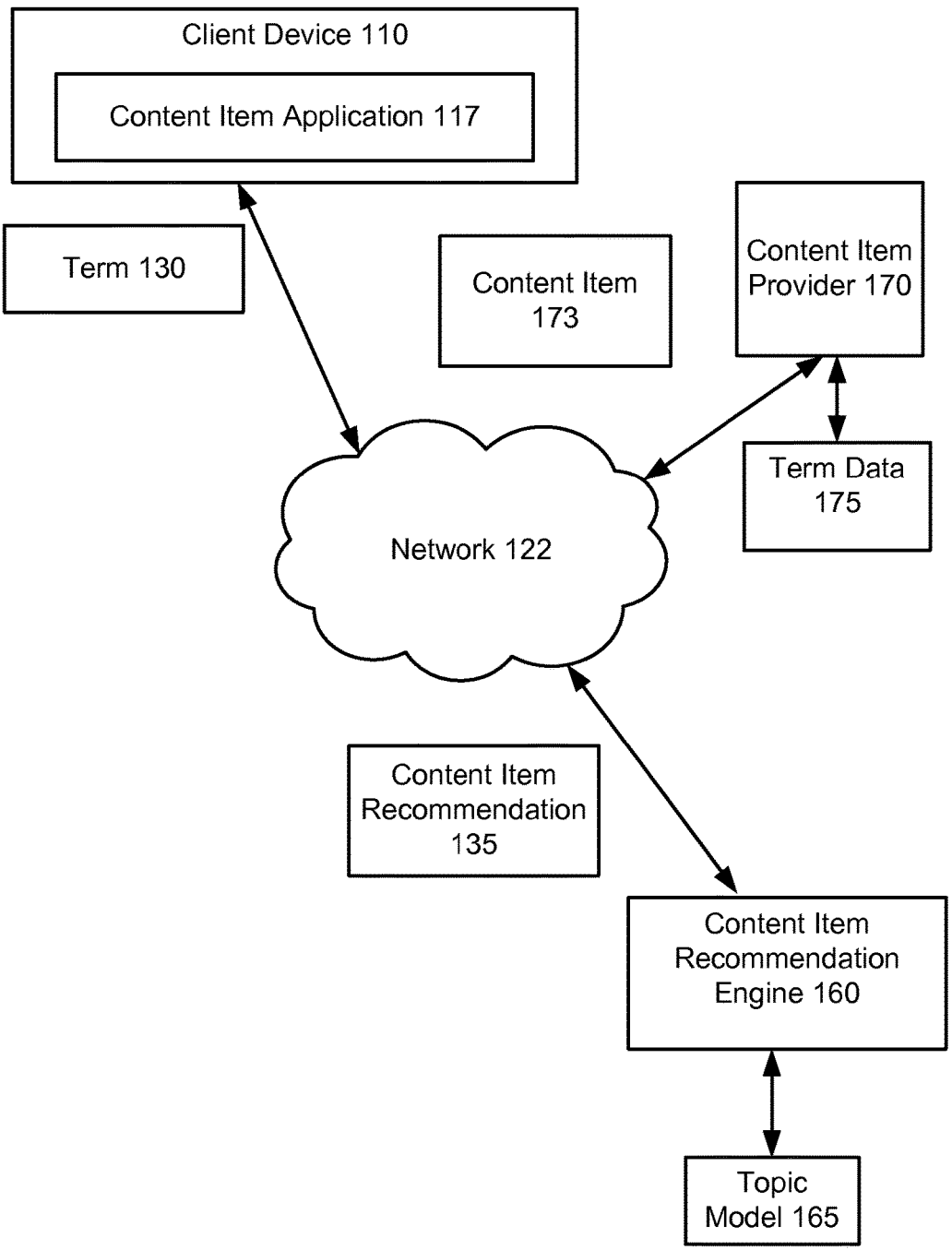
FIG. 1 is an illustration of an exemplary environment for recommending content items in response to received terms.

FIG. 1 is an illustration of an exemplary environment 100 for recommending content items in response to received terms. The environment 100 may include a content item recommendation engine 160, a content item provider 170, and a client device 110 in communication through a network 122. The network 122 may be a variety of network types including the public switched telephone network (PSTN), a cellular telephone network, and a packet switched network (e.g., the Internet). Although only one client device 110, one content item provider 170, and one content item recommendation engine 160 are shown in FIG. 1, there is no limit to the number of client devices 110, content item recommendation engines 160, and content item providers 170 that may be supported.

Figure 6:
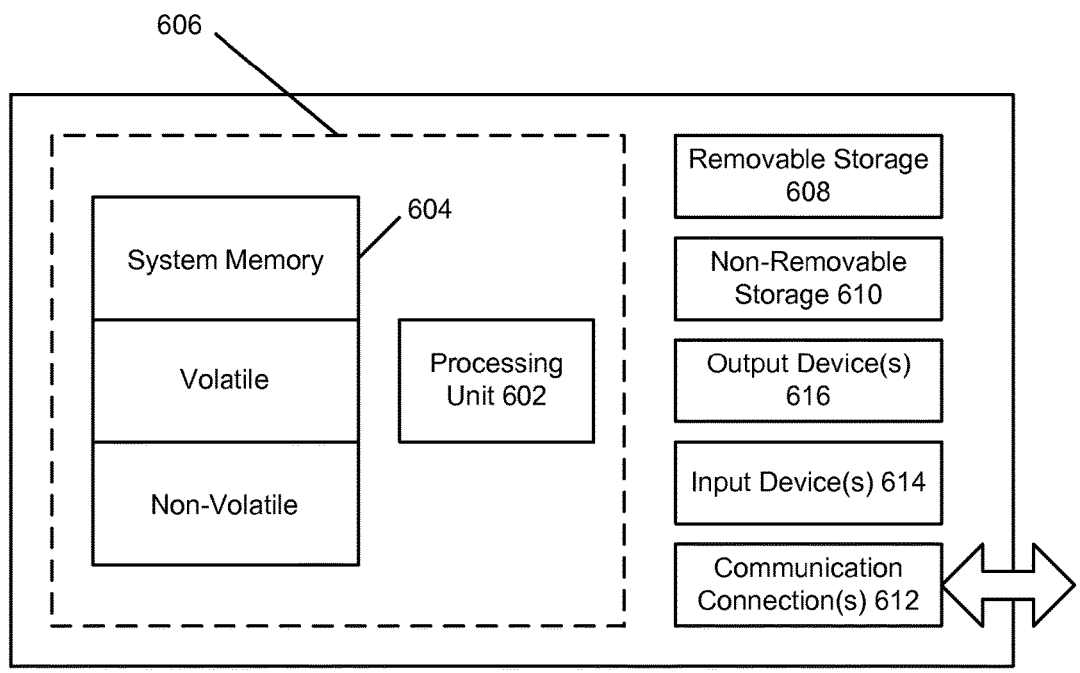
FIG. 6 shows an exemplary computing environment in which example embodiments and aspects may be implemented.

The client devices 110, content item recommendation engines 160, and content item providers 170 may each be implemented using a variety of a variety of computing devices such as smart phones, desktop computers, laptop computers, tablets, and video game consoles. Other types of computing devices may be supported. A suitable computing device is illustrated in FIG. 6 as the computing device 600.

The content item provider 170 may store and/or provide one more content items 173 through the network 122. A content item 173 as used herein may include a variety of media and file types such as songs, videos, books, documents, images, and any other type of file that may be used, viewed, or edited by a user of a client device using a content item application 117. For example, a user may download or stream content items 173 that are songs from a content item provider 170 that specializes in music, and may listen to the content items 173 using a content item application 117 such as a media player executed by the client device 110 associated with the user.

Each content item 173 may be associated with one or more terms 130. The terms 130 associated with a content item 173 may be one or more words from a predetermined vocabulary. The terms 130 associated with a content item 173 may depend on the type of content item 173. For example, where the content item 173 is a song, the terms 130 associated with the content item 173 may be the lyrics of the song. Where the content item 173 is a video such as a movie or television show, the terms 130 associated with the content item 173 may be words of dialog that are spoken during the content item 173. Where the content item 173 is a document such as a book or a magazine, the terms associated with the content item 173 may be the words from the text of the content item 173. The terms 130 associated with each content item 173 may be stored by the content item provider 170 as term data 175.

Users of the content item application 117 may desire to use content items 173 associated with a particular mood or topic. For example, a user listening at work to content items 173 that are songs, may desire to hear content items 173 that are songs about working. Similarly, a user who is interested in travel may desire to watch content items 173 that are travel related.

To facilitate such content item 173 discovery, the content item recommendation engine 160 may allow users of content item applications 117 to submit one or more terms 130 that describe the content items 173 that they are interested in, and may provide content item recommendations 135 in response to the one or more terms 130. The content item recommendations 135 may comprise pointers or links to one or more content items 173 that match or are otherwise responsive to the submitted one or more terms 130. For example, the content items recommendation 135 may be provided in a playlist.

In contrast with existing methods of content item discovery that rely on computationally expensive analyses of the content items (e.g., acoustic analysis), or the collection and analysis of descriptions or annotations of the content items collected from various sources on the Internet, the content item recommendation engine 160 may generate content item recommendations 135 based on the terms 130 associated with each content item 173. By not utilizing computational expensive analyses of content items 173 and Internet-based annotations, the speed and efficiency at which content item recommendations 135 may be generated may be increased.

In some implementations, the content item recommendation engine 160 may generate content item recommendations 135 using a topic model 165. A topic may be a word or phrase that is meant to capture a subset of the terms 130 in the predetermined vocabulary used by the content items 173. For example, a topic "leisure" may cover many terms 130 such as "sports", "games", "fun", "relax", and "leisure." Similarly, the topic "love" may cover terms 130 such as "romance", "date", "friendship", and "love." Depending on the implementation, the topics may be selected by a user or an administrator, based on the types of content items 173 and the intended usage of the topics. For example, the topics selected for songs may be different than the topics selected for films. Similarly, the topics selected for content item 173 discovery that will be used by children may be different than the topics selected for content item 173 discovery that will be used by adults.

The content item recommendation engine 160 may process the terms 130 associated with each content item 173 to determine a probability for each term 130 that is associated with each content item 173 with respect to each topic. The probability for a term 130 with respect to a topic is the probability that the term 130 is associated with the topic. The greater the probability, the greater the likelihood that the term 130 is covered by the topic.

The determined probabilities can be stored as part of the topic model 165, and can be later used by the content item recommendation engine 160 to provide content item recommendations 135. For example, a user may submit a term 130 such as "roads" to the content item recommendation engine 160. Based on the topic model 165, the content item recommendation engine 160 may determine that the topic with the highest probability with respect to the term 130 "roads" is "travel." The content item recommendation engine 160 may provide content item recommendations 135 that include content items 173 that are associated with the topic "travel."

Figure 2:
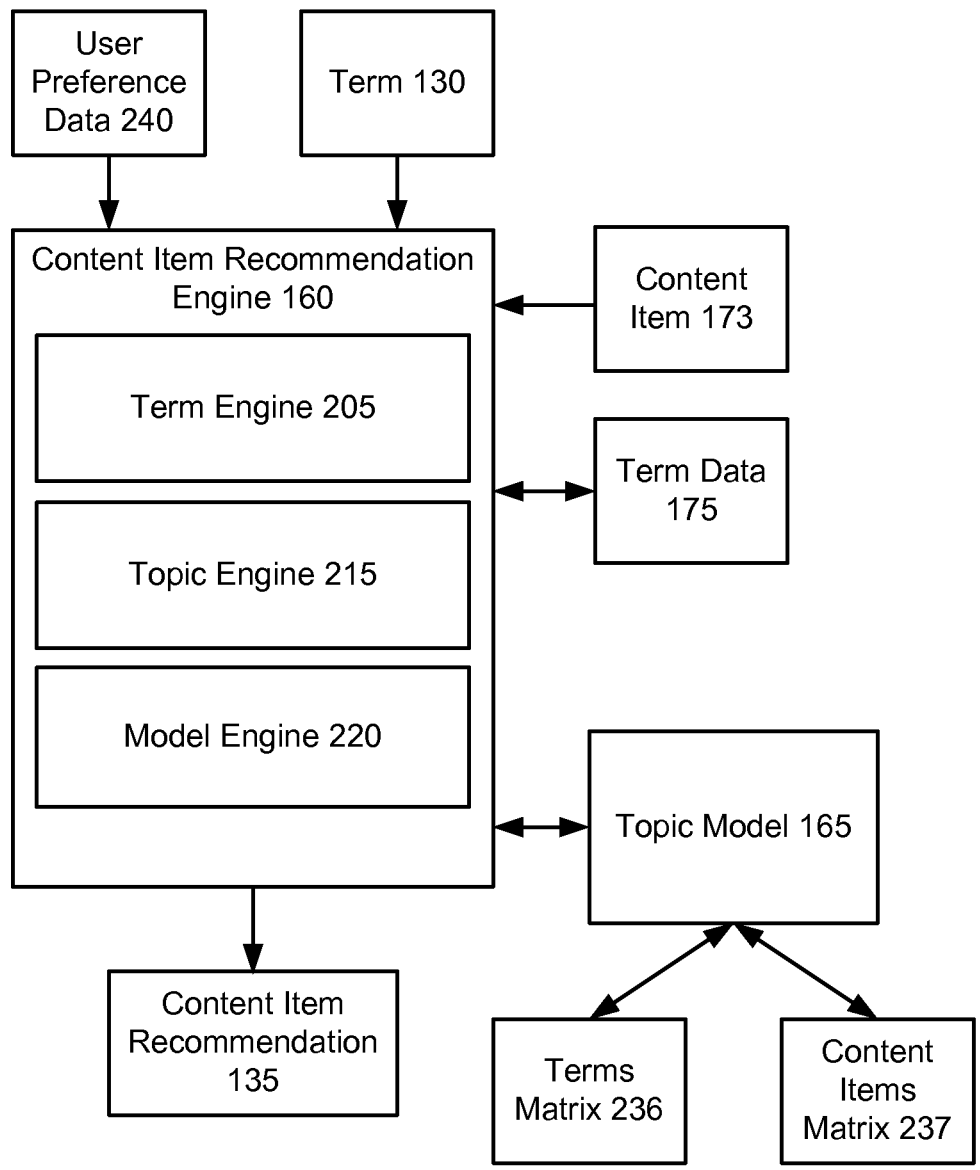
FIG. 2 is an illustration of an implementation of an exemplary content item recommendation engine.

FIG. 2 is an illustration of an implementation of an exemplary content item recommendation engine 160. The content item recommendation engine 160 may include one or more components including a term engine 205, topic engine 215, and model engine 220. More or fewer components may be included in the content item recommendation engine 160. Some or all of the components of the content item recommendation engine 160 may be implemented by one or more computing devices such as the computing device 600 described with respect to FIG. 6.

The term engine 205 may associate terms 130 with content items 173. Depending on the implementation, the term engine 205 may determine the terms 130 associated with each content item 173, or may receive the terms 130 from one or more content item providers 170. For example, where the content items 173 are songs and the terms 130 are lyrics, the term engine 205 may be determine the lyrics for a song by querying one or more databases that provide lyrics for songs, or may determine the lyrics for a song using voice recognition software. Where the content items 173 are videos, the term engine 205 may determine the terms 130 by querying one or more databases that provide scripts for videos, based on closed captioning information, or using voice recognition software. Other methods may be used.

The term engine 205 may normalize the terms 130 associated with each content item 173. In some implementations, the terms 130 may be normalized by removing terms 130 such as articles, prepositions, and pronouns. For example, terms 130 such as "the", "a", "for", "in", "he", "she", and "it" may be removed by the term engine 205. The term engine 205 may also remove contractions and proper nouns from the terms 130 associated with each content item 173.

The term engine 205 may also normalize the terms 130 associated with each content item 173 by normalizing the tense and number used for the terms. For example, the term engine 205 may make nouns and verbs singular, and may make verbs use the present tense. Any method for normalizing text may be used.

The term engine 205 may generate a term-frequency matrix based on the normalized terms 130 associated with each content item 173. Depending on the implementation, the term-frequency matrix may include a row for each content item 173 and a column for each term 130 associated with any of the content items 173. Each entry in the term-frequency matrix may be a count of the number of times that the term 130 associated with the column of the entry appears in the content item 173 associated with the row of the entry. Any method for counting occurrences of terms 130 in content items 173 may be used. The generated term-frequency matrix may be stored by the term engine 205 as the term data 175.

The topic engine 215 may select topics for the content items 173. A topic may be a term or phrase that is meant to cover or encompass many of the ideas and/or themes represented by the various terms 130 associated with the content items 173. For example, the topic "freedom" may cover terms 130 used in content items 173 such as "opportunity", "right", "liberty", "power", and "opportunity." The topic "love" may cover terms 130 such as "affection", "friendship", "passion", "crush", "cherish", "like", and "flame." The topics and the number of topics may be selected by a user or an administrator. Alternatively, the topics and the number of topics may be selected by the topic engine 215 based on the most frequently occurring terms 130 associated with all of the content items 173. Other methods may be used.

The model engine 220 may generate the topic model 165 based on the term-frequency matrix generated by the term engine 205. The topic model 165 may be a probabilistic topical model and may, for each content item 173, indicate a probability that the content item 173 is associated with each of the topics. The model engine 220 may generate the topic model 165 using any known method for generating a probabilistic topical model, such as latent dirichlet allocation, for example. Other methods may be used. With probabilistic topical models, the content items 173 do not have to be initially labeled using one or more of the topics in order to train the model. The statistical relationships between the terms 130, topics, and content items 173 are instead inferred by the model engine 220 as hidden structures based on the term-frequency matrix.

Depending on the implementation, the model engine 220 may use latent dirichlet allocation, or a technique from the same family, to generate a terms matrix 236 and a content items matrix 237. The terms matrix 236 may be a matrix that has a row for each of the terms 130 associated with the content items 173 and a column for each of the topics, or vice versa. Each entry in the terms matrix 236 may be a probability that the term 130 associated with the row of the entry is related to the topic associated with the column of the entry. The terms 130 used in the terms matrix 236 may be the terms 130 normalized by the term engine 205.

Similarly, the content items matrix 237 may be a matrix that has a row for each of the content items 173 and a column for each of the topics, or vice versa. Each entry in the content items matrix 237 may be a probability that the content item 173 associated with the row of the entry is related to the topic associated with the column of the entry.

The content item recommendation engine 160 may use the terms matrix 236 and/or the content items matrix 237 of the topic model 165 to generate content item recommendations 135 based on a received term 130. Depending on the implementation, when the content item recommendation engine 160 receives a term 130 from a user of a client device 110, the content item recommendation engine 160 may retrieve the row corresponding to that term 130 from the terms matrix 236. The retrieved row may be thought of as a vector with a probability for each of the topics with respect to the received term 130. The content item recommendation engine 160 may select the topic having the highest probability with respect to the received term 130 from the vector.

After selecting a topic, the content item recommendation engine 160 may retrieve the column corresponding to the selected topic from the content items matrix 237. Similarly as described above for the terms matrix 236, the retrieved column may be thought of as a vector with a probability for each of the content items 173 with respect to the selected topic.

The content item recommendation engine 160 may rank the content items 173 based on their probabilities with respect to the selected topic, and may select the highest ranked or most probable content items 173 for the content item recommendations 135. For example, the content item recommendation engine 160 may select the top ten, twenty, thirty, etc. content items 173 for the content item recommendations 135. The number of content items 173 in the content item recommendations 135 may be set by a user or an administrator, or may be specified by the user that provided the term 130.

The content item recommendation engine 160 may provide the content item recommendations 135 to the user that provided the term 130. Depending on the implementation, the content item recommendations 135 may be provided as a playlist or other file format that may be used by the content item application 117 to retrieve the associated content items 173 from one or more of the content item providers 170. Alternatively or additionally, the content item recommendations 135 sent to the client device 110 may include copies of the recommended content items 173.

In some implementations, the content item recommendation engine 160 may consider user preference data 240 associated with the user that provided the term 130 when selecting the content items 173 for the content item recommendations 135. The user preference data 240 may indicate the types or categories of content items 173 that are preferred by the user. For example, where the content items 173 are songs, the user preference data 240 may include indicators of particular songs that the user likes or dislikes, or particular genres of songs (e.g., rock, rap, country, etc.) that are liked or disliked by the user.

When the content item recommendation engine 160 retrieves the vector of content item 173 probabilities for the selected topic from the content items matrix 237, the content item recommendation engine 165 may remove the entries for the content items 173 that are known to be disliked by the user or that are associated with genres that are known to be disliked by the user as indicated by the user preference data 240. Alternatively or additionally, the content item recommendation engine 160 may weigh (i.e., increase or decrease) the probabilities associated with the content items 173 for the topic to favor content items 173 that are liked by the user and disfavor content items 173 that are not liked by the user.

Figure 3:
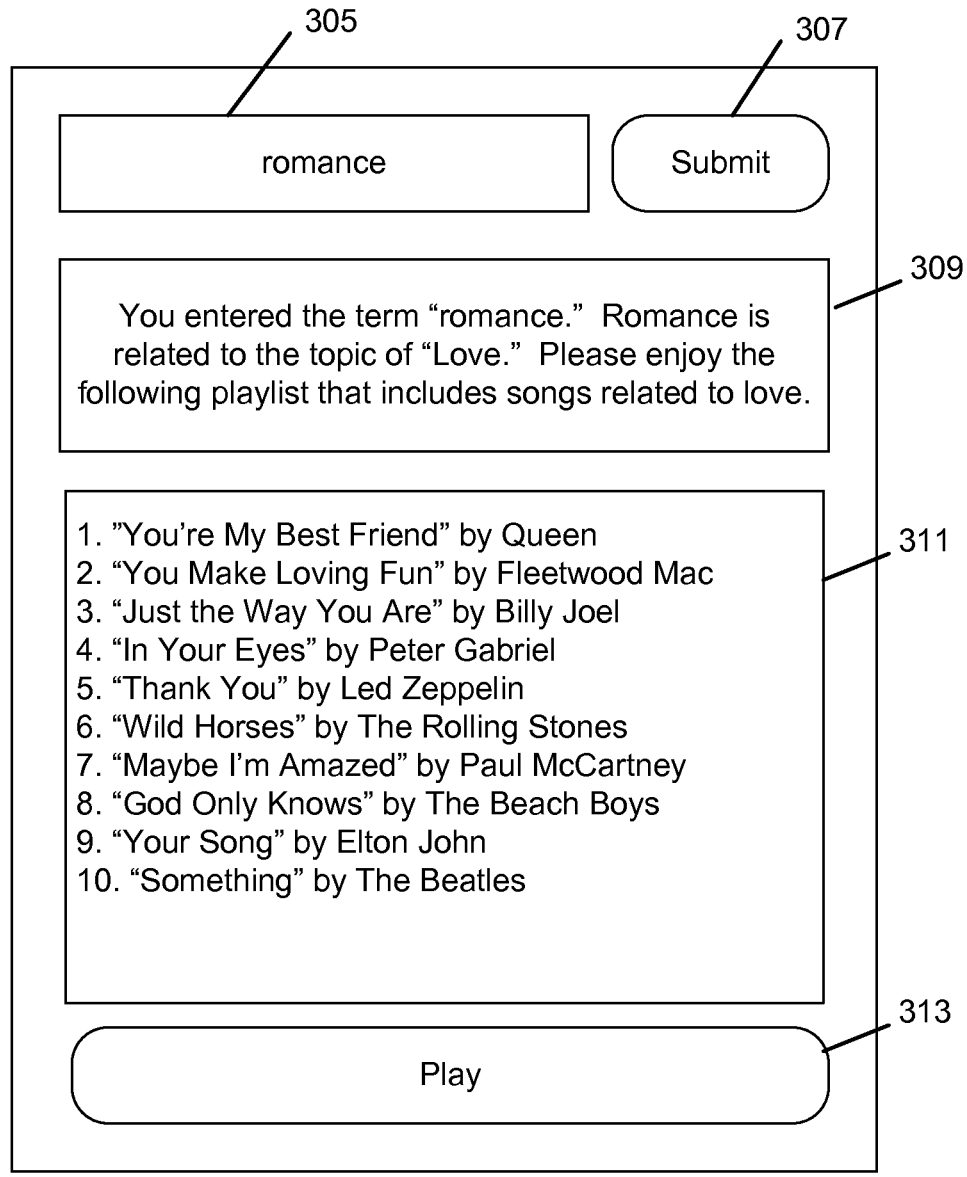
FIG. 3 is an illustration of an example user interface that may be used to provide terms to the content item recommendation engine and to receive content item recommendations from the content item recommendation engine based on the provided terms.

FIG. 3 is an illustration of an example user interface 300 that may be used to provide terms 130 to the content item recommendation engine 160 and to receive content item recommendations 135 from the content item recommendation engine 160. In the example shown, the user interface 300 is used for recommending content items 173 that are songs; however, the user interface 300 can be used for recommending any type of content items 173. Depending on the implementation, the user interface 300 may be provided by a content item application 117, or may be provided by the content item recommendation engine 160 through a website, for example.

The user interface 300 includes a text box 305 through which a user may enter a term that describes the particular topic or mood that the user would like to discover songs that are related to. In the example shown, the user has entered the term 130 "romance" into the text box 305 indicating that the user is interested in songs that are related to "romance." After entering the term 130 in the text box 305, the user may submit the term 130 to the content item recommendation engine 160 by clicking or selecting the button 307 labeled "submit."

The content item recommendation engine 160 may receive the term 130 "romance" and may use the terms matrix 236 to determine the topic that has the highest probability with respect to the term 130 "romance." In the example shown, the determined topic is "Love", and is displayed to the user in a window 309 of the user interface 300.

The content item recommendation engine 160 may use the content items matrix 237 to determine songs that that have the highest probability with respect to the topic "Love." Some subset of the songs having the highest probability may be provided to the user as the content item recommendations 135. In the example shown, the top ten songs having the highest probability with respect to the topic "Love" are displayed to the user in a window 311. The user may select a particular song, and may play the particular song by selecting the button 313 labeled "Play."

Figure 4:
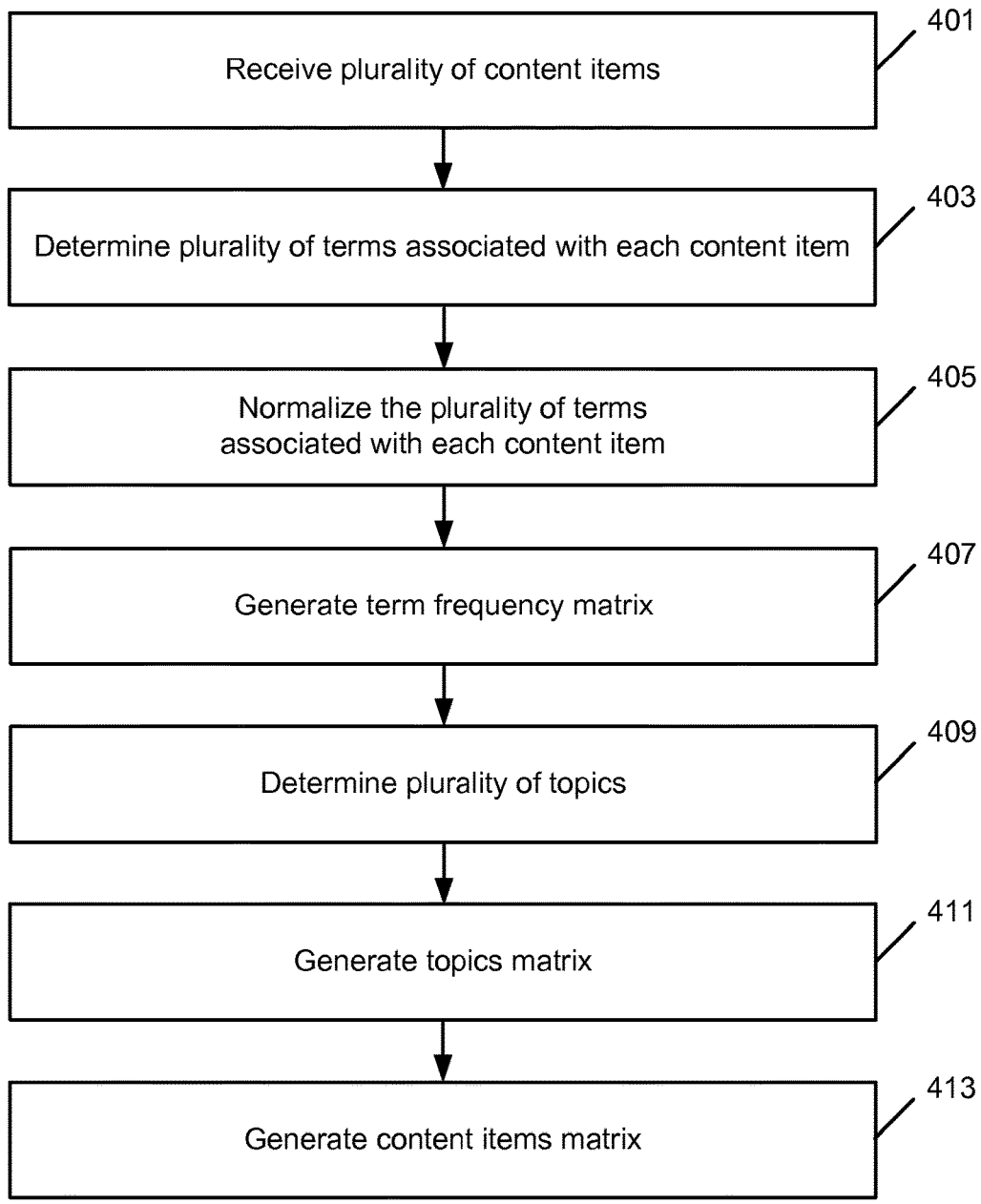
FIG. 4 is an operational flow of an implementation of a method for generating a topic model based on terms associated with content items.

FIG. 4 is an operational flow of an implementation of a method 400 for generating a topic model 165 based on terms 130 associated with content items 173. The method 400 may be implemented by the content item recommendation engine 160.

At 401, a plurality of content items is received. The plurality of content items 173 may be received from one or more content item providers 170 by the content item recommendation engine 160. The plurality of content items 173 may be songs, although other types of content items 173 such as videos, documents, and images, may be supported.

At 403, a plurality of terms associated with each content item is determined. The plurality of terms associated with each content item 173 may be determined by the term engine 205 of the content item recommendation engine 160. In implementations where the content items 173 are songs, the term engine 205 may determine the plurality of terms 130 for a content item 173 based on the lyrics associated with the content item 173. The lyrics associated with each content item 173 may be received by the term engine 205 from the content item provider 170 as part of the term data 175. Alternatively or additionally, the lyrics may be retrieved by the term engine 205 from one or more websites, or may be determined by the term engine 205 from the content items 173 using techniques such as voice recognition. Other methods may be used.

At 405, the plurality of terms associated with each content item is normalized. The terms 130 may be normalized by the term engine 205 of the content item recommendation engine 160. Depending on the implementation, the terms 130 may be normalized by standardizing the tenses used by the terms 130, removing terms 130 that are articles, pronouns, or prepositions, and restricting the terms 130 to a particular vocabulary. Any method for text normalization may be used.

At 407, a term-frequency matrix is generated. The term-frequency matrix may be generated by the term engine 205 of the content item recommendation engine 160 by counting or determining the occurrence(s) of each of the terms 130 in each of the content items 173.

At 409, a plurality of topics is determined. The plurality of topics may be determined by the topic engine 215. Depending on the implementation, each topic may represent a broad category of terms 130 and may be determined by a user or administrator.

At 411, a terms matrix is generated. The terms matrix 236 may be part of the topic model 165 and maybe generated by the model engine 220 of the content item recommendation engine 160 from the term-frequency matrix using a probabilistic topical model, such as latent dirichlet allocation, for example. Other methods may be used. In some implementations, the terms matrix 236 may be generated by, for each term of the plurality of terms associated with each content item, determining a probability for the term with respect to each of the topics of the plurality of topics based on the term-frequency matrix. Other methods may be used.

At 413, a content items matrix is generated. The content items matrix 237 may be part of the topic model 165 and maybe generated by the model engine 220 of the content item recommendation engine 160 from the term-frequency matrix using a probabilistic topical model. In some implementations, the content items matrix 237 may be generated by, for each content item of the plurality of content items, determining a probability for the content item with respect to each of topics of the plurality of topics based on the terms-frequency matrix. Other methods may be used.

Figure 5:
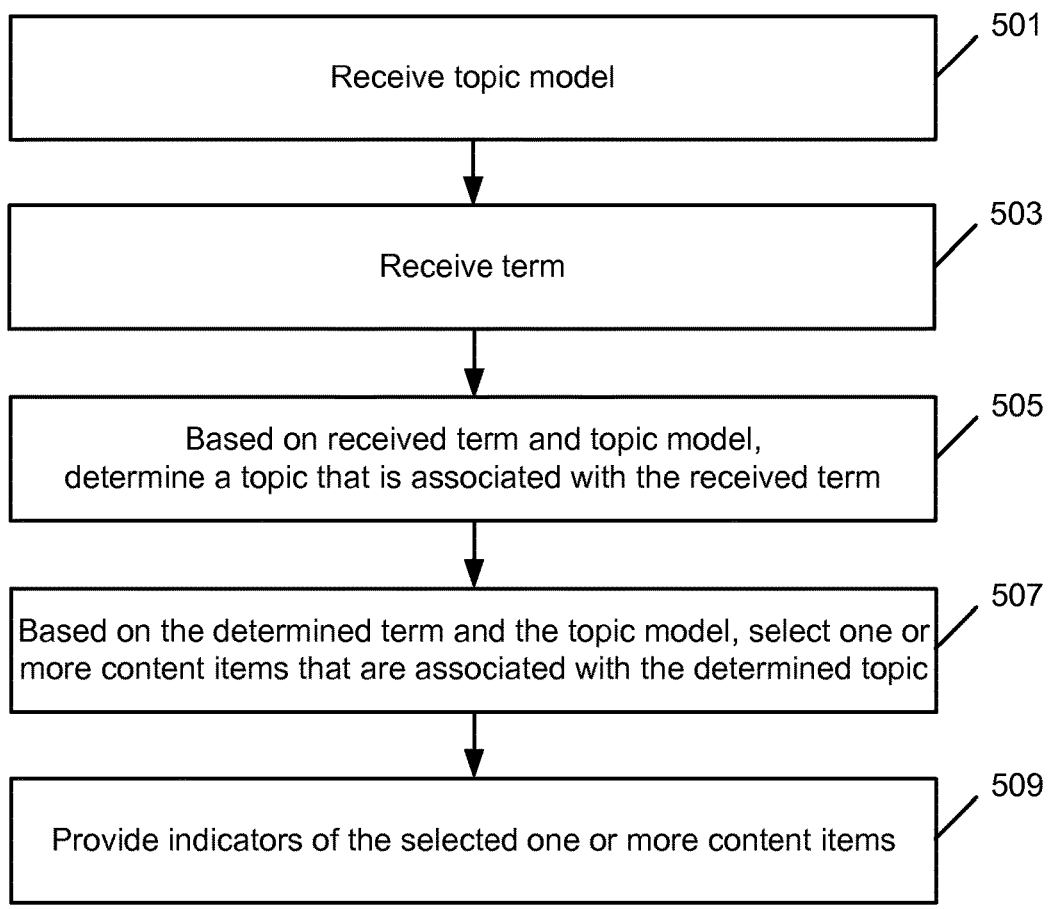
FIG. 5 is an operational flow of an implementation of a method for recommending content items in response to a received term.

FIG. 5 is an operational flow of an implementation of a method 500 for recommending content items 173 in response to a received term 130. The method 500 may be implemented by the content item recommendation engine 160.

At 501, a topic model is received. The topic model 165 may be received by the content item recommendation engine 160. The topic model 165 may have been generated based on terms 130 associated with a plurality of content items 173. Depending on the implementation, the topic model 165 may include a terms matrix 236 and a content items matrix 237.

At 503, a term is received. Term 130 may be received by the content item recommendation engine 160 from a user of a client device 110. The term 130 may be a word that describes a particular mood or type of content item 173 that a user is interested in using. For example, the term may indicate a type of music that the user is interest in listening to.

At 505, a topic associated with the received term is determined. The topic may be determined by the content item recommendation engine 160 using the terms matrix 236 of the topic model 165. The terms matrix 236 may include, for each term 130, a probability that the term 130 is associated with each topic. Depending on the implementation, the content item recommendation engine 160 may determine the topic with the highest probability with respect to the received term 130.

At 507, one or more content items that are associated with the determined topic are selected. The one or more content items 173 may be selected by the content item recommendation engine 160 using the content items matrix 237 of the topic model 165. The content items matrix 237 may include, for each content item 173, a probability that the content item 173 is associated with each topic. Depending on the implementation, the content item recommendation engine 160 may select the one or more content items 173 with the highest probability with respect to the determined topic.

At 509, indicators of the selected one or more content items are provided. The indicators of the selected one or more content items 173 may be provided by the content item recommendation engine 160 as the content item recommendations 135.

FIG. 6 shows an exemplary computing environment in which example embodiments and aspects may be implemented. The computing device environment is only one example of a suitable computing environment and is not intended to suggest any limitation as to the scope of use or functionality.

Numerous other general purpose or special purpose computing devices environments or configurations may be used. Examples of well-known computing devices, environments, and/or configurations that may be suitable for use include, but are not limited to, personal computers, server computers, handheld or laptop devices, multiprocessor systems, microprocessor-based systems, network personal computers (PCs), minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 6, an exemplary system for implementing aspects described herein includes a computing device, such as computing device 600. In its most basic configuration, computing device 600 typically includes at least one processing unit 602 and memory 604. Depending on the exact configuration and type of computing device, memory 604 may be volatile (such as random access memory (RAM)), non-volatile (such as read-only memory (ROM), flash memory, etc.), or some combination of the two. This most basic configuration is illustrated in FIG. 6 by dashed line 606.

Computing device 600 may have additional features/functionality. For example, computing device 600 may include additional storage (removable and/or non-removable) including, but not limited to, magnetic or optical disks or tape. Such additional storage is illustrated in FIG. 6 by removable storage 608 and non-removable storage 610.

Computing device 600 typically includes a variety of computer readable media. Computer readable media can be any available media that can be accessed by the device 600 and includes both volatile and non-volatile media, removable and non-removable media.

Computer storage media include volatile and non-volatile, and removable and non-removable media implemented in any method or technology for storage of information such as computer readable instructions, data structures, program modules or other data. Memory 604, removable storage 608, and non-removable storage 610 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 500. Any such computer storage media may be part of computing device 600.

Computing device 600 may contain communication connection(s) 612 that allow the device to communicate with other devices. Computing device 600 may also have input device(s) 614 such as a keyboard, mouse, pen, voice input device, touch input device, etc. Output device(s) 616 such as a display, speakers, printer, etc. may also be included. All these devices are well known in the art and need not be discussed at length here.

It should be understood that the various techniques described herein may be implemented in connection with hardware components or software components or, where appropriate, with a combination of both. Illustrative types of hardware components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. The methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

In an implementation, a system for recommending songs based on terms associated with the songs is provided. The system includes at least one computing device and a recommendation engine. The recommendation engine is adapted to, for each song of a plurality of songs, determine a plurality of terms associated with the song, and determine a plurality of topics. The recommendation is further adapted to, for each term of the plurality of terms associated with each song, determine a probability for the term with respect to each of the topics of the plurality of topics. The recommendation engine is further adapted to, for each song of the plurality of songs, determine a probability for the song with respect to each of the topics of the plurality of topics. The recommendation engine is further adapted to receive a term of the plurality of terms associated with each song, based on the determined probabilities for the received term with respect to each of the topics of the plurality of topics, select a topic of the plurality of topics, based on the selected topic and the determined probabilities for each song with respect to the selected topic, select one or more songs of the plurality of songs, and provide the selected one or more songs in response to the received term.

Implementations may include some or all of the following features. The recommendation engine may be further adapted to normalize the plurality of terms associated with each song. The recommendation engine may be further adapted to generate a term-frequency matrix from the plurality of terms associated with each song. The probability for each term with respect to each of the topics of the plurality of topics may be determined based on the term-frequency matrix using a probabilistic graphical model. The probabilistic graphical model may be a latent dirichlet allocation model.

In an implementation, a method for recommending songs based on lyrics associated with the songs is provided. The method includes receiving a topic model by a computing device, receiving a term of a plurality of terms by the computing device, based on the received term and the topic model, determining a topic of the plurality of topics that is associated with the received term by the computing device, based on the determined topic and the topic model, selecting one or more songs that are associated with the determined topic from a plurality of songs by the computing device, and providing indicators of the selected one or more songs by the computing device.

Implementations may include some or all of the following features. The topic model may be a probabilistic topical model. The probabilistic topical model may be a latent dirichlet allocation model or a technique from the same family. The indicators of the selected one or more songs may include a playlist. Each song may be associated with terms of the plurality of terms and the topic model may be generated by generating a term-frequency matrix from the terms associated with each song of the plurality of songs, for each term of the plurality of terms, determining a probability for the term with respect to each of the topics of the plurality of topics using the term-frequency matrix, and for each song of the plurality of songs, determining a probability for the song with respect to each topic of the plurality of topics using the term-frequency matrix. The terms associated with each song may be normalized. Determining the topic of the plurality of topics that is associated with the received term may include determining the topic with a highest determined probability for the received term. Selecting the one or more songs that are associated with the determined topic from the plurality of songs may include ranking the songs of the plurality of songs based on the probabilities associated with each song for the determined topic, and selecting the one or more songs based on the ranking.

In an implementation, a method for recommending content items based on terms associated with the content items is provided. The method includes receiving a plurality of content items by a computing device, for each content item, determining a plurality of terms associated with the content item by the computing device, determining a plurality of topics by the computing device, for each term of the plurality of terms associated with each content item, determining a probability for the term with respect to each of the topics of the plurality of topics by the computing device, for each content item of the plurality of content items, determining a probability for the content item with respect to each of the topics of the plurality of topics by the computing device, receiving a term of the plurality of terms associated with each of the plurality of content items by the computing device, based on the determined probabilities for the received term with respect to each of the topics of the plurality of topics, selecting a topic of the plurality of topics by the computing device, based on the selected topic and the determined probabilities for each content item with respect to the selected topic, selecting one or more content items by the computing device; and providing the selected one or more content items in response to the received term by the computing device.

Implementations may include some or all of the following features. The content items may be songs, and the plurality of terms associated with each content item may be lyrics. The plurality of terms associated with each content item may be normalized. The content items may be documents, and the plurality of terms associated with each document may be terms used in the document. A term-frequency matrix may be generated from the plurality of terms associated with each content item. The probability for each term with respect to each of the topics of the plurality of topics may be determined based on the term-frequency matrix using a probabilistic graphical model. The probabilistic graphical model may be a latent dirichlet allocation model.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A system for recommending songs based on terms associated with a plurality of songs, comprising:
    at least one computing device; and a recommendation engine adapted to:
        for each song of the plurality of songs, determine a plurality of terms associated with the song;
        determine a plurality of topics, each topic including at least one of the plurality of terms;
        for each term of the plurality of terms associated with each song, determine a matching probability for the term with respect to each topic of the plurality of topics;
        for each song of the plurality of songs, determine a matching probability for the song with respect to each topic of the plurality of topics;
        using a user interface, receive a term of the plurality of terms associated with each song of the plurality of songs from a particular user;
        receive, using the user interface, user preference data associated with the particular user, the user preference data comprising an indication of at least one of a type or a category of songs that are liked or disliked by the particular user;
        based on the determined matching probability for the received term with respect to each topic of the plurality of topics, select a topic of the plurality of topics;
        based on the selected topic, the user preference data, and the determined matching probability for each song with respect to the selected topic, select one or more songs of the plurality of songs; and provide the selected one or more songs in response to the received term.

2. The system of claim 1, wherein the recommendation engine is further adapted to normalize the plurality of terms associated with each song.

3. The system of claim 1, wherein the recommendation engine is further adapted to generate a term-frequency matrix from the plurality of terms associated with each song.

4. The system of claim 3, wherein the matching probability for each term with respect to each topic of the plurality of topics is determined based on the term-frequency matrix using a probabilistic graphical model.

5. The system of claim 4, wherein the probabilistic graphical model is a latent Dirichlet allocation model.

6. A method, implemented by at least one computing device, for recommending songs based on terms associated with a plurality of songs, comprising:
for each song of the plurality of songs, determine a plurality of terms associated with the song;
determining a plurality of topics, each topic including at least one of the plurality of terms;
for each term of the Plurality of terms associated with each song, determining a matching probability for the term with respect to each topic of the plurality of topics;
for each song of the plurality of songs, determining a matching probability for the song with respect to each topic of the plurality of topics;
using a user interface, receiving a term of the plurality of terms associated with each song of the plurality of songs from a particular user;
receiving, using the user interface, user preference data associated with the particular user, the user preference data comprising an indication of at least one of a type or a category of songs that are liked or disliked by the particular user;
based on the determined matching probability for the received term with respect to each topic of the plurality of topics, determining a topic of the plurality of topics;
based on the determined topic, the user preference data, and the determined matching probability for each song with respect to the determined topic, selecting one or more songs of the plurality of songs by the computing device; and
providing indicators of the selected one or more songs in response to the received term via the user interface.

7. The method of claim 6, wherein the topic model is a probabilistic topical model.

8. The method of claim 7, wherein the probabilistic topical model is a latent Dirichlet allocation model.

9. The method of claim 6, wherein the indicators of the selected one or more songs comprise a playlist.

10. The method of claim 6, further comprising generating the topic model by:
generating a term-frequency matrix from the plurality of terms associated with each song of the plurality of songs;
for each term of the plurality of terms, determining the matching probability for the term with respect to each topic of the plurality of topics using the term-frequency matrix; and
for each song of the plurality of songs, determining the probability for the song with respect to each topic of the plurality of topics using the term-frequency matrix.

11. The method of claim 10, further comprising normalizing the plurality of terms associated with each song.

12. The method of claim 10, wherein determining the topic of the plurality of topics that is associated with the received term comprises determining g topic with a highest determined probability for the received term.

13. The method of claim 10, wherein selecting the one or more songs that are associated with the determined topic from the plurality of songs comprises ranking the plurality of songs of the plurality of songs based on the matching probabilities of the plurality of terms associated with each song for the determined topic, and selecting the one or more songs based on the ranking.

14. A method for recommending content items based on terms associated with a plurality of content items, comprising:
receiving the plurality of content items by a computing device;
for each content item, determining a plurality of terms associated with the content item by the computing device;
determining a plurality of topics by the computing device, each topic including at least one of the plurality of terms;
for each term of the plurality of terms associated with each content item, determining a matching probability for the term with respect to each topic of the plurality of topics by the computing device;
for each content item of the plurality of content items, determining a matching probability for the content item with respect to each topic of the plurality of topics by the computing device;
receiving, using a user interface, a term of the plurality of terms associated with each of the plurality of content items by the computing device from a particular user;
receiving, using the user interface, user preference data associated with the particular user, the user preference data comprising an indication of at least one of a type or a category of content items that are liked or disliked by the particular user;
based on the determined matching probabilities for the received term with respect to each topic of the plurality of topics, selecting a topic of the plurality of topics by the computing device;
based on the selected topic, the user preference data, and the determined matching probability for each content item with respect to the selected topic, selecting one or more content items by the computing device; and
providing the selected one or more content items in response to the received term by the computing device.

15. The method of claim 14, wherein the content items are songs, and the plurality of terms associated with each content item are lyrics.

16. The method of claim 14, further comprising normalizing the plurality of terms associated with each content item.

17. The method of claim 14, wherein the content items are documents, and the plurality of terms associated with each document are terms used in the document.

18. The method of claim 14, further comprising generating a term-frequency matrix from the plurality of terms associated with each content item.

19. The method of claim 18, wherein the matching probability for each term with respect to each of the plurality of topics is determined based on the term-frequency matrix using a probabilistic graphical model.

20. The method of claim 19, wherein the probabilistic graphical model is a latent Dirichlet allocation model.

* * * * *